May 7, 1968 G. R. SANTANA 3,382,492

MAGNETIC DATA RECORD FORMATTING

Filed July 27, 1965

INVENTOR
GEORGE R. SANTANA

By Robert B Crouch

ATTORNEY 3,382,492

MAGNETIC DATA RECORDING FORMATTING

George R. Santana, Saratoga, Calif., assignor to International Business Machines Corporation, Armonk, N.Y., a corporation of New York Filed July 27, 1965, Ser. No. 475,187
3 Claims. (Cl. 340—174.1)

ABSTRACT OF THE DISCLOSURE

A technique of providing format signals for information records magnetically recorded with a self-clocking code which involves the omission of regularly occurring flux reversals from a sequence of clock intervals. The omission is detected by a gap sensor to identify the occurrence of the format signals.

The present invention relates to a random access magnetic memory and more particularly to means for formatting a data record in a random access memory.

Presently known random access memories utilize a magnetic storage medium which may be constructed in a variety of forms, e.g., a cylindrical drum, a plurality of disk surfaces, a number of tape strips or etc. Information is recorded on the medium in parallel or concentric tracks, each track containing one or more records of data arranged in sequence. Format signals, such as beginning and end of record indications, are provided to permit differentiation between adjacent records in a track. Various techniques have been employed to produce such format signals, including: dividing the medium into sectors; use of a separate format track; and recording special characters in the data track. In dividing the medium into sectors, slots or magnetic inserts are provided at fixed intervals along the length or circumference of the medium, so that the data tracks are effectively divided into equal length sectors, each of which is adapted to receive a single record of information. The slots or inserts are detected by a suitable transducer and then counted to identify a particular sector. With this technique, the fixed sector length imposes a limitation on record length and requires that the data be pre-analyzed and then organized to accommodate the fixed record length and permit efficient utilization of the capacity of the memory.

In the use of a separate format track, the memory is divided into groups of tracks, each group including one track which is designated as a format track and used to store only format signals. Format signals magnetically recorded on the format track by the user govern the record lengths on the remaining tracks of the group. The record format can thus be tailored initially to a particular user, but cannot subsequently be changed without completely rewriting all of the records stored in that group of tracks. This technique produces initial flexibility in determining record formats, but decreases overall memory capacity by the number of tracks allocated to formatting.

Much greater flexibility in record formatting is provided by recording format signals in the data track itself, thus permitting each record to be formatted individually if desired. This is accomplished by recording special characters at the beginning and end of each record as it is written on the track. The special characters are produced by designating selected binary combinations of whatever code is used to record the data. These binary combinations are then restricted to use as format signals and are preferably not available for recording data. This technique permits the recording of random length records at the option of the user of the memory and has the additional advantage that a separate format transducer is not required. The primary shortcoming of this approach is the necessity for allocation of selected binary combinations to formatting, thus reducing the number of binary combinations available for encoding data. Alternatively, if all combinations must be made available for recording data, a special character or combination of special characters may appear within a data record and thus give a false format signal.

The object of the present invention is to provide means for producing data record format signals which are always distinguishable from valid data representations.

The present invention provides a means for formatting for use with self-clocking codes, i.e., codes which include at least one flux reversal during every clock interval. In such codes, primarily double frequency and phase modulation, a flux reversal occurs regularly at the beginning of each clock interval and an additional reversal may occur at the midpoint of an interval depending upon the binary value of the signal recorded in that clock interval. The present technique utilizes the fact that the absence of the regularly occurring flux reversal constitutes an invalid condition which cannot possibly occur in correctly recorded data. Accordingly, the omission of the first flux reversal in a clock interval, or a sequence of intervals, can be used to identify format information without the possibility of confusion with valid data.

Other objects and many of the attendant advantages of this invention will be readily understood by reference to the following detailed description of embodiments of the invention as illustrated in the accompanying drawings wherein.

Figure 1:
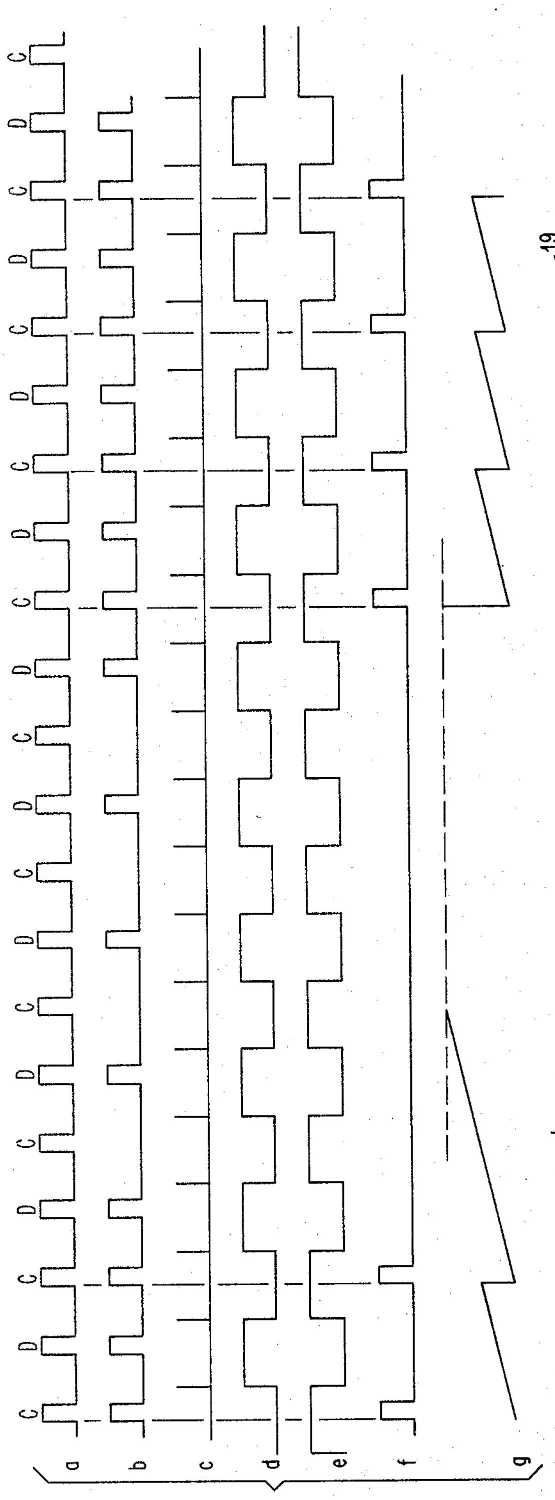
FIG. 1 is a series of waveforms illustrating double frequency signals and depicting the relationship of signals in the different portions of the circuit of FIG. 2.

Double frequency recording is a saturation type of recording which is self-clocking, i.e., there is at least one flux reversal or bit recorded per clock interval. The double frequency recording technique can be explained as one in which a clock bit occurs during every clock interval and an additional data bit is either present or absent depending upon the binary value of the data recorded during that clock interval. This technique can also be defined as one in which data of a first binary value is indicated by a single bit during a clock interval and data of a second binary value is indicated by two bits within a clock interval. To facilitate the readout process, it is desirable to achieve the maximum separation between bits. This, in practice, results in a clock bit at the beginning of every clock interval and a data bit at the midpoint of each clock interval having a second binary value. Referring to FIG. 1, waveform *a* illustrates ideal double frequency read signals. In this waveform, the clock bits C occur at a uniform frequency at the beginning of each clock interval, while the data bits D occur at the midpoints of the appropriaate clock intervals. Waveform *b* is a pattern of clock and data bits recorded to provide format signals according to the present invention. Waveform *b* is similar to waveform *a* except for the omission of the third, fourth, fifth, and sixth clock bits (left to right). Since double frequency recording requires a regularly occurring clock bit during each clock interval, the pattern of waveform *b* is obviously an invalid bit combination and is readily detectable as such. The missing clock bits of waveform *b* thus provide a pattern which is easily recognizable as a format signal and which is completely dissimilar to any of the valid bit combinations which might be used to encode data signals.

Figure 2:
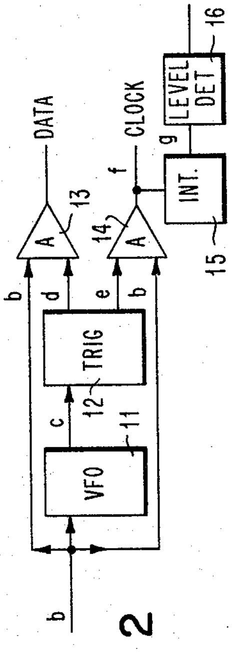
FIG. 2 is a schematic diagram of logical circuitry employed in one form of the invention.

A first embodiment of circuitry for detecting the pattern of waveform *b* is illustrated in schematic form in FIG. 2. This circuitry includes a variable frequency oscillator 11, a binary trigger 12, a pair of AND gates 13 and 14, and an integrator and level detector 15 and 16. Shaped read signals, such as waveform *b* are fed to the VFO which is set to operate at a frequency of twice the desired clock interval. As shown in waveform *c*, the VFO produces an output signal in time sequence with both the leading edge and the midpoint of each clock interval. The output of the VFO is counted down in the binary trigger 12 to produce waveforms *d* and *e* as its outputs. Waveform *d* and the read signals of waveform *b* provide the inputs to AND gate 13. The signal level of waveform *d* is raised during the midpoint of each clock interval and is dropped at the trailing and leading edges of the clock interval, so that the data bits of waveform *b* are gated through AND gate 13 to the data line. Waveform *e*, which is the inverse of waveform *d*, is applied to AND gate 14 along with the read signals in order to gate the clock signals of waveform *b* onto the clock line. The separated clock signals are shown in waveform *f* which illustrates a gap occurring between the second and seventh clock intervals of the sequence. This gap is sensed by any suitable means, such as the integrator 15 and the level detector 16. Integrator 15 is a ramp generator which integrates the time between pulses of waveform *f* and is of the type that is squelched by each pulse applied to it. As illustrated in waveform *g*, integrator 15 is set by the first clock pulse of waveform *f* and then squelched by the second clock pulse. In the subsequent gap, the integrator is not squelched and it provides an output at the level determined by level detector 16 until it is reset by the next clock pulse. The format signal is thus indicated by an output from the integrator and level detector. In waveform *g* the level detector is set to provide an output signal when two clock bits in a row are omitted from waveform *b*. This provides a safety factor and prevents a single dropped clock bit, which may occur accidentally, from being interpreted to produce an erroneous format signal.

Figure 3:
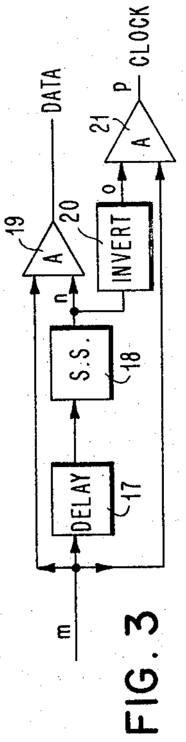
FIG. 3 is a schematic diagram of logical circuitry of an alternative embodiment.

An alternative form of circuitry is illustrated in FIG. 3 as including a delay mechanism 17, a single shot 18, a pair of AND gates 19 and 21 and an inverter 20. Delay mechanism 17 may be any suitable means, such as a capacitor, monostable multivibrator, etc., that will pass each of the signals on the input line with a uniform delay. Single shot 18 is a monostable multivibrator of the type that is set by the first signal from the delay mechanism and which will then ignore any further signals until it has timed out.

Figure 4:
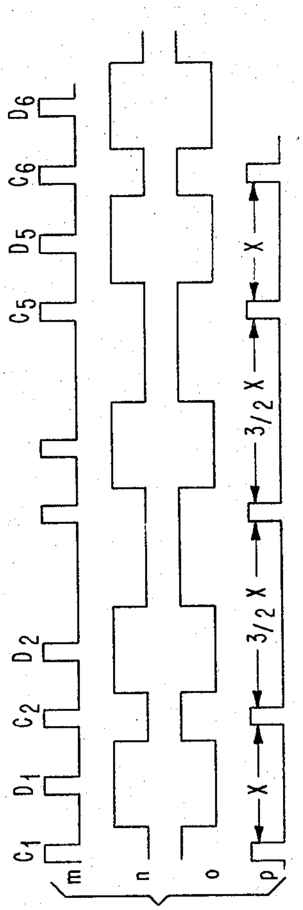
FIG. 4 is a series of waveforms illustrating the relationship of signals in different portions of the circuit of FIG. 3.

In FIG. 4, waveform *m* shows a pattern of clock and data bits recorded to provide a format signal which is recognizable by the circuitry of FIG. 3. The pattern which produces the format signal consists of a sequence of bits from which the regularly occurring bit has been omitted. This pattern is repeated in adjacent clock intervals, as illustrated in waveform *m*, for reliability purposes. Waveform *n*, which is the output of single shot 18, provides a gate for passing the data bits through AND gate 19. Similarly, waveform *o*, which is the inverse of waveform *n* is used to gate the clock bits through AND gate 21 onto the clock line. The period of single shot 18 is selected to be slightly more than one-half the clock interval, so that the signal level of waveform *n* will be raised during the occurrence of any data bit. The period selected for single shot 18, in combination with the length of the delay of element 17, causes the single shot to time out after the occurrence of any data bit, but prior to the occurrence of the next clock bit. Accordingly, once the single shot is set by a clock bit it will continue to be reset by subsequent clock bits until the occurrence of a format mark.

Thus, a pulse will occur regularly in waveform *p* at the beginning of each clock interval until the occurrence of a format signal. At that time, the period between pulses is expanded to 3/2 clock interval. As seen from waveform *n*, the signal level of the waveform is raised during the occurrence of $D_2$ and dropped thereafter. The signal level would normally be raised again by the next clock bit, but the clock bit $C_3$ has been omitted from waveform *m* to provide the format signal. A pulse is provided in waveform *m* during the time period normally occupied by $D_3$ for the purpose of resetting single shot 18 and denoting the end of the first expanded gap in waveform *p*. Since single shot 18 will time out after $D_2$, it will be reset by the next pulse of waveform *m*, in this case the pulse normally corresponding to $D_3$. This pulse will be gated through AND gate 21 and will appear on the clock line. At this point, the single shot 18 is synchronized with the data bits of waveform *m* and, if undisturbed, would continue to be reset by each data bit in turn. Referring again to waveform *m*, a pulse appears at the next bit position (corresponding to $C_4$), but the next adjacent pulse (corresponding to $D_4$) is omitted. The pulse appearing at $C_4$ time does not effect the logic of FIG. 3, but is added to maintain a maximum spacing of one clock interval between bits which is a characteristic feature of double frequency recordnig. If this pulse were omitted, the omission of the next adjacent pulse would introduce a third frequency with consequent noise problems for the circuitry of FIG. 3. The single shot 18 will time out after $C_4$ time and, since the next pulse has been omitted, it will not be reset until the occurrence of the next pulse, i.e., $C_5$. Pulse $C_5$ will be gated through AND gate 21 to define the end of the second expanded gap. At the same time, single shot 18 will be resynchronized with the clock bits and will continue to be reset by the clock bits until the occurrence of another format signal. The expanded gaps in waveform *p* can be detected by conventional gap-sensing techniques similar to the circuitry of FIG. 2.

The logical circuits of FIGS. 2 and 3 each require an initial synchronization to ensure that the clock bits are properly separated from the data bits. In this circuit of FIG. 3, the single shot must be synchronized with the clock bits and, in the circuit of FIG. 2, the proper phase of binary trigger 12 must be selected, to insure that the data bits are gated onto the data line and the clock bits gated onto the clock line.

While the invention has been particularly shown and described with reference to preferred embodiments thereof, it will be understood by those skilled in the art that the foregoing and other changes in the form and details may be made therein without departing from the spirit and scope of the invention.

I claim:

1. Means for producing a record format signal from a magnetic read signal which is made up of regularly occurring clock bits interspersed with data bits, the format signal consisting of a pattern of missing clock bits, said means including:

first means for generating a gating signal from the magnetic read signal;

data detecting means connected to the first means for separating the data bits from the read signal;

clock detecting means connected to the first means for separating the clock bits from the read signal; and means connected to the clock detecting means for detecting and signaling the presence of the pattern of missing clock bits.

2. Means for producing a record format signal from a magnetic read signal made up of regularly occurring clock bits interspersed with additional data bits, the format signal consisting of the omission of at least one of the regularly occurring clock bits, said means including:

first means for generating a gating signal from the read signal;

data detecting means connected to the output of the first means for separating data signals from the read signal;

clock detecting means connected to the output of the first means for separating recorded clock signals from the read signal; and means connected to the output of the clock detecting means for signaling the presence of the format signal by detecting the omission of the clock bit.

3. Means for producing a record format signal from a double frequency read signal which is made up of data bits interspersed with regularly occurring clock bits, the format signal consisting of the omission of at least one clock bit, said means including:

first means for generating a gating signal from the double frequency read signal;

data detecting means connected to the output of the first means for separating the data bits from the read signal;

clock detecting means connected to the output of the first means for separating the clock bits from the read signal; and means connected to the output of the clock detecting means for signaling the presence of the format signal by detecting the omission of the clock bit.

References Cited

UNITED STATES PATENTS

| | | | |
|---|---|---|---|
| 3,217,329 | 11/1965 | Gabor | 340—174.14 |
| 2,739,238 | 3/1956 | Bartelt | 328—196 |

BERNARD KONICK, *Primary Examiner.*

A. J. NEUSTADT, *Assistant Examiner.*

Dedication

3,382,492.—*George R. Santana*, Saratoga, Calif. MAGNETIC DATA RECORDING FORMATTING. Patent dated May 7, 1968. Dedication filed July 5, 1973, by the assignee, *International Business Machines Corporation.*

Hereby dedicates to the Public the remainder of the term of said patent.

[*Official Gazette November 13, 1973.*]